US006665664B2

(12) United States Patent
Paulley et al.

(10) Patent No.: US 6,665,664 B2
(45) Date of Patent: Dec. 16, 2003

(54) PRIME IMPLICATES AND QUERY OPTIMIZATION IN RELATIONAL DATABASES

(75) Inventors: Glenn Norman Paulley, Waterloo (CA); Kristofer Paul Vorwerk, Sudbury (CA)

(73) Assignee: Sybase, Inc., Dublin, CA (US)

( * ) Notice: Subject to any disclaimer, the term of this patent is extended or adjusted under 35 U.S.C. 154(b) by 80 days.

(21) Appl. No.: 10/007,203

(22) Filed: Dec. 3, 2001

(65) Prior Publication Data

US 2002/0143754 A1 Oct. 3, 2002

Related U.S. Application Data

(60) Provisional application No. 60/261,114, filed on Jan. 11, 2001.

(51) Int. Cl.$^7$ ............................................. G06F 17/30
(52) U.S. Cl. ............................................. 707/4; 707/2
(58) Field of Search ............................... 707/1, 2, 3, 4, 707/5, 6, 7, 8, 9, 10, 104.1, 101, 102, 201

(56) References Cited

U.S. PATENT DOCUMENTS

5,619,692 A * 4/1997 Malkemus et al. ............. 707/2
6,381,616 B1 * 4/2002 Larson et al. ................ 701/201

OTHER PUBLICATIONS

Aguilera, G. et al., Reductions for Non–Clausal Theorum Proving, Theoretical Computer Science, vol. 266, pp. 81–112, Sep. 2001.

Chan, Chee–Yong et al., An Efficient Bitmap Encoding Scheme for Selection Queries, Association for Computing Machinery SIGMOD International Conference on Management of Data, pp. 215–226, Philadelphia, Pennsylvania, May 1999.

Kullmann, O. et al., Algorithms for SAT/TAUT decision based on various measures, Preprint, 71 pages, available from http://www.cs.toronto.edu/~{}kullmann, Feb. 1999.

Beckert, Bernhard et al., Simplification of Many–Valued Logic Formulas Using Anti–Links, Journal of Logic and Computation, vol. 8, No. 97–18, pp. 569–587, 1998.

Chen, Yirng–an et al., Breadth First with Depth–First BDD Construction: A Hybrid Approach, CMU–CS–97–120, School of Computer Science, Carnegie Mellon University, Pittsburgh, Pennsylvania, Mar. 1997.

Kullmann, O. et al., Deciding Propositional tautologies: Algorithms and their complexity, Preprint, 82 pages, available from www.cs.toronto.edu/~kullmann. Submitted to Information and Computation, Jan. 1997.

Coudert, Olivier, On Solving Covering Problems, Proceedings of 33rd Annual Conference on Design Automation, pp. 197–202, Las Vegas, Nevada, Association for Computing Machinery, Jun. 1996.

(List continued on next page.)

Primary Examiner—Diane D. Mizrahi
Assistant Examiner—Yicun Wu
(74) Attorney, Agent, or Firm—John A. Smart

(57) ABSTRACT

An improved normalization methodology enabling better optimization of SQL queries is described. The normalization methodology effectively handles three-valued SQL search conditions and operates in reduced memory environments. A query is examined and selectively normalized by examining each segment of the query to determine whether it is advantageous to fully convert that segment to conjunctive normal form (CNF). If full conversion of the segment to CNF is not advantageous, then only the useful conjunctive conditions (prime implicates) that can be derived from the original input are saved. These useful conjuncts (prime implicates) are unioned with the original statement, resulting in a search condition that is semantically equivalent to the original expression, but that can be better exploited by a query optimizer. This enables better optimization of the original query without the system overhead that would result from full normalization of the query.

52 Claims, 5 Drawing Sheets

OTHER PUBLICATIONS

Coudert, Olivier, Doing Two–Level Logic Minimization 100 Times Faster, Proceedings of the Sixth Annual ACM-SIAM Symposium on Discrete Algorthims, San Francisco, California, pp. 112–121, ACM Press, 1995.

Levy, Alon Y. et al., Query Optimization by Predicate Move–Around, Proceedings of the 20th VLDB Conference, Santiago, Chile, Morgan Kaufmann, Sep. 1994.

Liao, Stan et al., Boolean Factorization Using Multiple–Valued Minimization, Proceedings of the IEEE/ACM International conference on Computer–aided design, p. 606–611, Santa Clara, California, Nov. 1993.

Murray, Neil V. et al., Dissolution: Making Paths Visual, Journal of the ACM, vol. 40, No. 3, pp. 504–535, ACM Press, Jul. 1993.

Muralikrishna, M., Improving Unnesting Algorithms for Join Aggregate SQL Queries, Proceedings of the 18th VLDB Conference on Very Large Data Bases, pp. 91–102, Vancouver, British Columbia, Canada, Morgan Kaufmann, 1992.

Kean, Alex et al., A Corrigendum for the Optimized IPIA, Journal of Symbolic Computation, 17: 181–187, Academic Press Limited, 1994.

Coudert, Olivier et al., Implicit and Incremental Computation of Primes and Essential Primes of Boolean Functions, Proceedings of the 29th Annual Conference on Design Automation, pp. 36–39, Anaheim, California, IEEE Computer Society Press, Jun. 1992.

Jackson, Peter, Computing Prime Implicants Incrementally, Proceedings of 11th International Conference on Automated Deduction, pp. 253–267, Sarasota Springs, New York, Jun. 1992.

Jackson, Peter, Computing Prime Implicants, Proceedings of the ACM Conference on Computer Science, pp. 65–72, Kansas City, Missouri, Association for Computing Machinery, Mar. 1992.

Jackson, Peter et al., Computing Prime Implicants, Proceedings of 10th International Conference on Automated Deduction, pp. 543–557, Kaiserlautern, Springer Verlag, Germany, Jul. 1990.

Mohan, C. et al., Single Table Access Using Multiple Indexes: Optimization, Execution, and Concurrency Control Techniques, Proceedings of the 2nd International Conference on Extending Database Technology (EDBT'90), Venezia, Italy, pp. 29–43, Springer–Verlag, Mar. 1990.

Kean, Alex et al., An Incremental Method for Generating Prime Implicants/Implicates, Journal of Symbolic Computation, 9: 185–206, Academic Press Limited, 1990.

Kim, Won, On Optimizing an SQL–like Nested Query, ACM Transactions on Database Systems, vol. 7, No. 3, pp. 463–469, Sep. 1982.

Chandra, Ashok K. et al., On the Number of Prime Implicants, Discrete Mathematics, 24: 7–11, 1978.

Hwa, H. R., A Method for Generating Prime Implicants of a Boolean Expression, IEEE Transactions on Computers, 23: 637–641, Jun. 1974.

Palopoli, Luigi et al., Algorithms for selective enumeration of prime implicants, Artificial Intelligence, 111: 1–2, pp. 41–72, 1999.

Silva, Joao P. M., On Computing Minimum Size Prime Implicants, ACM/IEEE International Workshop on Logic Synthesis (IWLS), May 1997.

Murray, Neil V. et al., Inference with Path Resolution and Semantic Groups, Journal of the ACM, vol. 34, No. 2, pp. 225–254, Apr. 1987.

Ramesh, Anavai et al., Fast Subsumption Checks Using Anti–Links, Journal of Automated Reasoning 18(1): 47–83, Kluwer Academic Publishers, 1997.

Ramesh, Anavai et al., CNF and DNF Considered Harmful for Computing Prime Implicants/Implicates, Journal of Automated Reasoning, 18: 337–356, Kluwer Academic Publishers, 1997.

Zhang, Weiye et al., Speeding Up Heterogeneous Data Access by Converting and Pushing Down String Comparisons, Proceedings of the 15th International Conference on Data Engineering, Sydney, Austrialia, IEEE Computer Society, Mar. 1999.

Paulley, Glenn et al., Exploiting Uniqueness in Query Optimization, Proceedings of the Tenth International Conference on Data Engineering, Houston, Texas, IEEE Computer Society, Feb. 1994.

Sebastiani, Roberto, Applying GSAT to Non–Clausal Formulas, Journal of Artificial Intelligence Research, 1: 309–314, AI Access Foundation and Morgan Kaufmann, 1994.

Ramesh, Anavai et al., Non–Clausal Deductive Techniques for Computing Prime Implicants and Prime Implicates, Proceedings of 4th International Conference on Logic Programming and Automated Reasoning, pp. 277–288, St. Petersburg, Russia, Jul. 1993.

Pirahesh, Hamid et al., Extensible/Rule Based Query Rewrite Optimization in Starburst, ACM SIGMOD International Conference on Management of Data, San Diego, California, pp. 39–48, Association for Computing Machinery, Jun. 1992.

Wang, Yalin, Transforming Normalized Boolean expressions into Minimal Normal Forms, Master's Thesis, University of Waterloo, Ontario, Canada, 1992.

Shekar, Shasi et al., A Formal Model of Trade–off between Optimization and Execution Costs in Semantic Query Optimization, Proceedings of the 14th VLDB Conference, Los Angeles, California, 1988.

Socher, Rolf, Optimizing the Clausal Normal Form Transform, Journal of Automated Reasoning, 7 (3): 325–336, Kluwer Academic Publishers, 1991.

Slagle, James R. et al., A New Algorithm for Generating Prime Implicants, IEEE Transactions on Computers, 19 (4): 304–310, 1970.

Quine, W. V., On Cores and Prime Implicants of Truth Functions, American Mathematics Monthly, 66: 755–760, 1959.

Quine, W. V., A Way to Simplify Truth Functions, American Mathematics Monthly, 62: 627–631, 1955.

Quine, W. V., The Problem of Simplifying Truth Functions, American Mathematics Monthly, 59: 521–531, 1952.

Watson, Pamela, et al.; Original articles –Angelman syndrome phenotype associated with mutations in MECP2, a gene encoding a methyl CpG binding protein; J Med Genet 2001; 38:224 –228.

Kleefstra, T., et al.; Short Report –De novo MECP2 frameshift mutation in a boy with moderate mental retardation, obesity and gynaecomastia; Clin Genet 2002: 61:359 –362.

Lam, Ching–Wan, et al.; Electronic Letter –Spectrum of mutations in the MECP2 gene in patients with infantile autism and Rett syndrome; J Med Genet 2000; 37 (http://jmedgenet.com/cgi/content/full/37/12/e41).

Vourc'h, Patrick, et al.; Short Report –No mutations in the coding region of the Rett syndrome gene MECP2 in 59 autistic patients; European Journal of Human Genetics (2001) 9, pp. 556 –558.

Beyer, Kim S., et al.; Original Investigation –Mutation analysis of the coding sequence of the MECP2 gene in infantile autism; Hum Genet (2002) 111:305 –309.

Clayton–Smith, J., et al.; Somatic mutatino in MECP2 as a non–fatal neurodevelopmental disorder in males; The Lancet, vol. 356, pp. 830 –832, Sep. 2, 2000.

Villard, L., et al.; Two affected boys in a Rett syndrome family; Neurology 2000; 55:1188 –1193.

Millat, Gilles, et al.; Niemann–Pick C1 Disease: The L1061T Substitution Is a Frequent Mutant Allele in Patients of Western European Descent and Correlates with a Classic Juvenile:Phenotype; Am. J. Hum. Genet. 65:1321 –1329, 1999.

Ng, Huck–Hui, et al.; MBD2 is a transcriptional repressor belonging to the MeCP1 histone deacetylase complex; Nature Genetics, vol. 23, pp. 58–61, Sep. 1999.

Wan, Minghong, et al.; Brief Research Communication –Evaluation of Two X Chromosomal Candidate Genes for Rett Syndrome: Glutamate Dehdrogenase–2 (GLUD2) and Rab GDP–Dissociation Inhibitor (GDI1); Am. J. Med. Genet. 78:169 –172, 1998.

Hendrich, Brian, et al.; Genomic structure and chromosomal mapping of the muring and human Mbd1, Mbd2, Mbd3, and Mbd4 genes; Mammalian Genome 10, pp. 906–912, 1999.

* cited by examiner

PRIME IMPLICATES AND QUERY OPTIMIZATION IN RELATIONAL DATABASES

RELATED APPLICATIONS

The present application is related to and claims the benefit of priority of the following commonly-owned provisional application(s): application Ser. No. 60/261,114, filed Jan. 11, 2001, entitled "Prime Implicates and Query Optimization in Relational Databases", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to computer-implemented methodologies for query optimization in a data processing system, such as a Database Management System (DBMS).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., "An Introduction to Database Systems, Volume I and II," Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft® clients connected to one or more Sybase® SQL Anywhere® Studio (Adaptive Server® Anywhere) database servers. Both Powersoft® and Sybase® SQL Anywhere® Studio (Adaptive Server® Anywhere) are available from Sybase, Inc. of Emeryville, Calif.

In today's computing environment, database technology can be found on virtually any device, from traditional mainframe computers to cellular phones. Sophisticated applications, whether human resources information systems or sales force automation systems, can "push" much of their complexity into the database itself. Indeed, this represents one of the main benefits of database technology. The challenge, however, is to support these applications, and the complex queries they generate, on small computing devices. At the same time, users expect the productivity and reliability advantages of using a relational DBMS.

Consider, for instance, the execution of a request for information from a relational DBMS. In operation, this request is typically issued by a client system as one or more Structured Query Language or "SQL" queries for retrieving particular data (i.e. data records meeting the query condition) from database tables on a server. For example, a simple SQL SELECT statement.

```
SELECT name
FROM employees
WHERE sal=10,000
``` results in a list of the names of those employees earning $10,000, where "employees" is a table defined to include information about employees of a particular organization. The syntax of SQL is well documented, see e.g., the above-mentioned "An Introduction to Database Systems." SQL has become the standard for relational database access, see, e.g. Melton, J. (ed.), "American National Standard ANSI/ISO/IEC 9075-2: 1999, Information Systems—Database Language—SQL Part2: Foundation," the disclosure of which is hereby incorporated by reference.

SQL queries express what results are requested but do not state how the results should be obtained. In other words, the query itself does not tell how the query should be evaluated by the database management system. Rather, a component called the optimizer determines the "plan" or the best method of accessing the data to implement the SQL query. The query optimizer is responsible for transforming an SQL request into an access plan composed of specific implementations of the algebraic operator selection, projection, join, and so forth. Typically, this is done by generating many different join strategies, evaluating the cost of each, and selecting the access plan with the lowest overall costs, where "cost" is a metric that measures a combination of factors, including, but not limited to, the estimated amount of computational overhead, the number of physical Input/Output ("I/O") operations, and the response time. However, producing an optimal access plan for any given SQL query is a complex problem.

Query optimization in a relational DBMS is largely based on the existence of conjunctive conditions in each query's Where clause. Conjunctive conditions are useful because they must each evaluate to true in order for the query's Where clause to be satisfied. Hence, such conjunctive conditions (or "prime implicates") can be naturally exploited by the query optimizer. However, traditionally the discovery of such prime implicates requires the database engine to first transform or "normalize" the original search condition into conjunctive normal form and remove redundant terms.

The problem of simplifying arbitrary Boolean expressions is a well-known problem in the history of computer science. Originally, the motivation for the study of this problem was its role in the minimization of Boolean functions and switching circuits (see, e.g., W. V. Quine, "The problem of simplifying truth functions," American Mathematics Monthly, 59:521–531, 1952; W. V. Quine, "A way to simplify truth functions," American Mathematics Monthly, 62:627–631, 1955; and James R. Slagle, Chin-Liang Chang, and Richard C. T. Lee, "A new algorithm for generating prime implicants," IEEE Transactions on Computers, 19(4) :304–310, 1970). Boolean state reduction has directly influenced power and material requirements by eliminating redundant gates and easing three-level NAND implementation. See, e.g., Olivier Coudert, "On solving covering problems," Proceedings of the 33rd Annual Conference on Design Automation, pages 197–202, Las Vegas, Nevada, June 1996. However, the difficulties of normalization and redundant term elimination in SQL query optimization have been mostly overlooked.

The goal of query optimization in a relational DMBS is not simply reducing the number of conditions to be examined. Although minimization of the number of conditions reduces the number of operations required during query processing, what is equally important to a relational DBMS engine is the discovery of prime implicates that can be exploited to deduce a cheaper data access strategy. These prime implicates may be redundant or subsumed by the original expression and therefore may be ignored or even pruned by a logic minimizer.

Theoretically, the most efficient SQL statement—in terms of the time required to execute it—could be determined by generating and costing all possible semantically-equivalent forms. However, in a real-world setting a database engine must generate useful prime implicates along with other semantic transformations without spending more time than is required to execute the unoptimized query. See, e.g., Shashi Shekhar, Jaideep Srivastava, and Soumitra Dutta, "A formal model of trade-off between optimization and execution costs in semantic query optimization," Proceedings of the 14th International Conference on Very Large Databases, pages 457–467, New York, N.Y., August 1988.

Existing simplification algorithms described in the literature (see e.g., Olivier Coudert and Jean Christophe Madre, "Implicit and incremental computation of primes and essential primes of Boolean functions," Proceedings of the 29th Annual Conference on Design Automation, pages 36–39, Anaheim, Calif., June 1992; H. R. Hwa, "A method for generating prime implicants of a Boolean expression," IEEE Transactions on Computers, 23:637–641, June 1974; Peter Jackson, "Computing prime implicates incrementally," Proceedings of the 11th International Conference on Automated Deduction, pages 253–267, Sarasota Springs, N.Y., June 1992; Peter Jackson and John Pais, "Computing prime implicants," Proceedings, 10th International Conference on Automated Deduction, pages 543–557, Kaiserlautern, Germany, July 1990; Luigi Palopoli, Fiora Pirri, and Clara Pizzuti, "Algorithms for selective enumeration of prime implicants." Artificial Intelligence, 111 (1–2): 41–72, July 1999; W. V. Quine, "A way to simplify truth functions," American Mathematics Monthly, 62:627–631, 1955; James R. Slagle, Chin-Liang Chang, and Richard C. T. Lee, "A new algorithm for generating prime implicants," above; Rolf Socher, "Optimizing the clausal normal form transformation," Journal of Automated Reasoning, 7(3): 325–336, September 1991; and Yalin Wang, "Transforming normalized Boolean expressions into minimal normal forms," Master's thesis, Department of Computer Science, University of Waterloo, Waterloo, Ontario, Canada, 1992) are all predicated on normalized input—that is the input expression is either in conjunctive normal form ("CNF") or disjunctive normal form ("DNF"). Conjunctive normal form is a mathematical expression that describes the Boolean condition wherein each clause contains only ORs and these clauses are connected by ANDs. A query that is fully transformed into CNF has only "ANDs" at the top row of the query tree and only "ORs" beneath.

The common approach used by current normalization algorithms is to convert a CNF expression to DNF (or vice-versa) simplifying the output expression to minimize redundancy. The reverse transformation yields a simplified expression in the original form (CNF or DNF). Current optimization techniques are predicated on the fact that the search conditions have been normalized into conjunctive normal form.

In the literature relating to the simplification of Boolean expressions (See, e.g., Alex Kean and George K. Tsiknis, "An incremental method for generating prime implicants/ implicates," Journal of Symbolic Computation, 9(2): 185–206, February 1990; W. V. Quine, "The problem of simplifying truth functions," above; W. V. Quine, "A way to simplify truth functions," above; W. V. Quine, "On cores and prime implicants of truth functions," American Mathematics Monthly, 66:755–760, 1959; and James R. Slagle, Chin-Liang Chang, and Richard C. T. Lee, "A new algorithm for generating prime implicants," above), the basic unit of any expression is termed a "literal." In this document a "predicate" corresponds to a "literal." The usefulness of converting the search conditions to conjunctive normal form is that for a clause that consists of only a single predicate (i.e., not "ORed with anything"), for any row in the result of that query that predicate must be true. Thus, if there are two such conditions in a CNF expression, then for any row of the result, both conditions must be true. If those two predicates refer to either attributes in the database or constants, then mathematical rules can be used to show that other conditions also must be true for any row in the result given that the first conditions are both true. For example, if you have only two clauses in a CNF expression that consist of a single predicate such as X=Y and Y=Z, then you can also infer that X=Z. For a query optimizer, discovering such prime implicates enables the optimizer to discover different access strategies for the query that will result in improved performance compared to optimizing the query in a naive fashion. Such prime implicates may enable the optimizer to discover new indexes that it can use, may avoid the need to scan certain tables or indexes, or cause a change in the join order of a particular query, thereby improving performance.

However, discovery of such prime implicates presents particular challenges in a relational DMBS environment that are not addressed by existing methods. One difficulty is that any particular SQL query sent to a database server need not have a search condition that is already in CNF. Traditionally, the database engine is first required to convert (normalize) the original search condition into CNF prior to searching for prime implicates. Another difficulty is that ANSI SQL requires the support of three-valued logic meaning that several of the simplification techniques utilized by existing methods no longer hold true. The computational problem with these simplification techniques is that converting any particular SQL query to CNF and eliminating redundancy in the expression is an NP-hard problem (see, e.g., Luigi Palopoli, Fiora Pirri, and Clara Pizzuti, "Algorithms for selective enumeration of prime implicants," above). A problem is called NP (non-deterministic polynomial) if its solution (if one exists) can be guessed and verified in polynomial time; non-deterministic means that no particular rule is followed to make the guess. An NP-hard problem is any one of a class of computational problems for which no efficient solution algorithm has been found.

In particular, this process of normalization of a given SQL query can result in a combinatorial explosion in the number of terms of the expression. Consider, for example, TPC-D Query 19 (TPC-D Benchmark Version 2.0.0.12, Transaction Processing Performance Council) illustrated below where the search condition is presented generally in disjunctive normal form (i.e., top level of query tree is ORs and the second level is ANDs), which is exactly the opposite of what an optimizer would normally like to see.

```
Select Sum (L-Extendedprice *(1 L-Discount)) as Revenue
From Lineitem, Part
Where      (P-Partkey = L-Partkey
           and P-Brand = 'BRAND#12'
           and P-Container In('SM CASE','SM BOX','SM PACK','SM PKG')
           and L-Quantity ≧ 1
           and L-Quantity ≦ 1+10
           and P-Size between 1 and 5
           and L-Shipmode In('AIR','AIR REG')
           and L-Shipinstruct = 'DELIVER IN PERSON')
     or    (P-Partkey = L-Partkey
           and P-Brand = 'BRAND#23'
           and P-Container In('MED BAG','MED BOX','MED PKG','MED PACK')
           and L-Quantity ≧10
           and L-Quantity ≦10+10
           and P-Size between 1 and 10
           and L-Shipmode In('AIR','AIR REG')
           and L-Shipinstruct = 'DELIVER IN PERSON')
     or    ( P-Partkey = L-Partkey
           and P-Brand = 'BRAND#34'
           and P-Container In('LG CASE','LG BOX','LG PACK','LG PKG')
           and L-Quantity ≧ 20
           and L-Quantity ≦ 20+10
           and P-Size between 1 and 15
           and L-Shipmode In('AIR','AIR REG')
           and L-Shipinstruct = 'DELIVER IN PERSON')
```

Optimization of Query 19 in its original form will likely yield a very inefficient access plan since the query lacks a conjunctive join condition. However, a naive transformation of the original Where clause's 24 predicates into CNF yields a Where clause now containing 378 predicates. The resulting computational and memory overhead of generating this many terms makes this transformation impracticable in many of the environments in which relational database management systems are used. In addition, the memory and execution costs for each SQL predicate must be considered. For instance, each predicate requires memory to store, evaluate, and determine its result for every comparison for every row. This results in a significant overhead on system performance. Moreover, once the query has been fully normalized, it is arguably impossible to simplify the query further, so the optimizer will be forced to evaluate each of those 378 predicates for every row. Thus, additional processing capacity is expended evaluating the exponential number of predicates derived from CNF normalization.

It is difficult to determine, when given any particular SQL query, how many predicates will result when the query is converted to CNF, because the size of the resulting CNF expression depends on how the predicates are connected through ANDs and ORs. Accordingly, it is difficult to apply heuristic rules to estimate the size of the normalized expression given an arbitrary SQL query. From a practical standpoint, the size of the normalized expression can only be determined during the process of converting it to CNF.

Because this process of fully normalizing an SQL query can be very expensive (and often detrimental to product performance), there is great need for an improved method for discovering useful conjunctive conditions from an arbitrary input expression without performing a full normalization of the query. Given the increasing amount of information stored in databases, there is great interest in an efficient and practical method for simplifying and optimizing the search conditions of complex queries, even in small-memory environments.

GLOSSARY

The following definitions are offered for purposes of illustration, not limitation, in order to assist with understanding the discussion that follows.

A or alpha: In this document the greek letter "alpha" or "A" is used to denote a function whose input is a predicate and whose output is the name of the attributes involved in the predicate.

CNF: "CNF" stands for conjunctive normal form which is a logical formula consisting of a conjunction of disjunctions where no disjunction contains a conjunction. For example, the conjunctive normal form of (A and B) or C is (A or C) and (B or C). CNF is often termed product of sums form. A clause C is in partial CNF if it is a conjunction of clauses $D_1, D_2, \ldots D_n$ where at least one $D_i$ is not a disjunctive clause. Conjunctive normal form is a mathematical expression that describes the Boolean condition wherein each clause contains only ORs and these clauses are connected by ANDs. A query that is fully transformed into CNF has only "ANDs" at the top row of the query tree and only "ORs" beneath.

DNF: "DNF" stands for disjunctive normal form which is a logical formula consisting of a disjunction of conjunctions where no conjunction contains a disjunction. For example, the disjunctive normal form of (A or B) and C is (A and C) or (B and C). DNF is often termed sum of products form. In disjunctive normal form the top level of the query tree is ORs and the second level is ANDs.

Implicant: A conjunctive clause A is an "implicant" of a search condition E if A does not contain redundant predicates and A implies E; hence all conjunctive clauses of a fully normalized condition E in DNF are its implicants. A is termed a "prime implicant" of E if A is an implicant of E, A is fundamental, and there does not exist another implicant A' such that A' implies A.

Implicate: A disjunctive clause A is an "implicate" of a search condition E if A does not contain redundant predicates and E implies A; hence all disjunctive clauses of a fully normalized condition E in CNF are its implicates.

Literal: The basic unit of any expression is termed a "literal." In this document a "predicate" corresponds to a "literal."

Normalization: In the context of database design, normalization is the process of organizing data to minimize redundancy. In this document, normalization refers to the process of converting a database query into a simpler form that can be more efficiently analyzed by the query optimizer to deduce better data access strategies.

Predicate: In the context of relational databases a "predicate" is a truth-valued function, possibly negated, whose domain is a set of attributes and/or scalar values and whose range is {true, false, unknown}. In this document a "predicate" corresponds to a "literal."

Prime Implicate: A clause A is termed a "prime implicate" of a search condition E if A is an implicate of E, A is fundamental and there does not exist another implicate A' such that A' implies A. In this document the term "prime implicate" shall refer generally to exploitable predicates which can be utilized during optimization and/or query execution to reduce the query's overall execution cost.

sch: The term "sch" is used in this document to denote a function whose input is a predicate and whose output is the correlation names (usually table names) from which the attributes referenced in the predicate are taken.

SUMMARY OF THE INVENTION

The improved normalization methodology of the present invention is based on Socher's minimization methodology (see Socher, R., above). Socher's minimization method uses a matrix as its basic data structure with the rows of the matrix representing unique literals and the columns representing the particular conjunct (or disjunct) in which the literals appear. Implicates and prime implicates are discovered by generating all paths through the matrix and discarding subsumed paths.

Existing query optimizers require fully normalized search conditions as input and assume the use of two-valued logic. The improved methodology of the present invention, on the other hand, features several improvements that are key to allowing it to operate with reduced memory requirements on non-normalized three-valued SQL search conditions.

The improved normalization methodology of the present invention comprises a preprocessing phase, in which expressions are simplified whenever possible, and a normalization phase, in which the simplified expression is analyzed and either fully converted to conjunctive normal form ("CNF") or, alternatively, modified by appending prime implicates to the original expression as described below. In the preprocessing phase, tautological and contradictory conditions are removed from the input expression and other conditions are simplified when possible. This preprocessing phase includes several steps that are designed to simplify the original query expression, thereby simplifying the matrix processing occurring in the normalization phase. Pruning conditions from the input data structure reduces memory consumption by decreasing the size of the input to the normalization routines.

The normalization phase takes an unnormalized search condition as input and evaluates the eligibility of the expression or portions of the expression for normalization. Rather than fully normalizing the expression, which in many cases is inefficient and results in an explosion of terms that must be processed, the normalization phase of the present invention selectively examines each element of the SQL statement by carefully descending the logic tree of the query. The expression is examined in segments and for each segment a determination is made as to whether or not it is advantageous to convert that segment of the expression to CNF. Segments that are too "expensive" to fully convert are not fully normalized to avoid a combinatorial explosion of terms and the resulting impact on system performance. Effectively, a limit is imposed on the depth to which sub-expressions are normalized to avoid an explosion in the number of terms.

If during this process of selective normalization of an expression, it is discovered that full conversion to CNF is too expensive, then the normalization and simplification process is altered. Instead of producing a fully normalized expression, the normalization method of the present invention saves only the useful prime implicates it can derive from the original input. These prime implicates are conjunctive conditions that can be exploited by the optimizer to deduce a more efficient data access strategy.

This process of selective normalization avoids the combinatorial explosion in terms that full normalization might entail. Moreover, it facilitates the discovery of exploitable prime implicates within these non-normalized expressions. The useful conjuncts (prime implicates) inferred from the normalization routines are unioned with the original statement. The result is a search condition that is semantically equivalent to the original expression, but that contains useful prime implicates that can be exploited by the optimizer. This enables better optimization of the original SQL query without the system overhead that would result from full normalization of the query.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of index data structures is desirable, including those employed in non-SQL database management environments. The description of the exemplary embodiments which follows is, therefore, for the purpose of illustration and not limitation.

A. Basic system hardware (e.g., for desktop and server computers)

Figure 1:
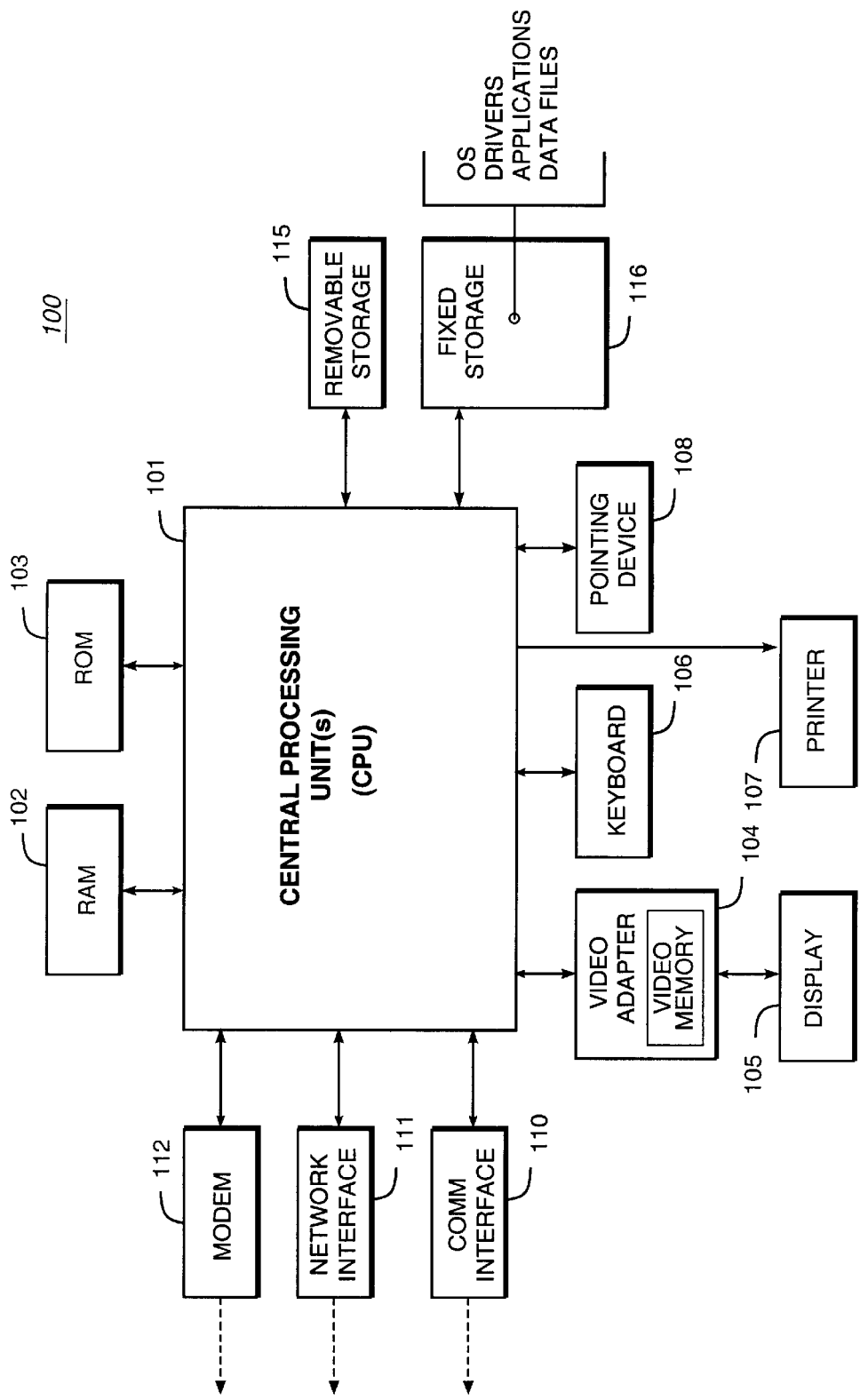
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s)

110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the screen or display device 105. In this manner, these input devices support manual user input for any process running on the system.

The computer system 100 displays text and/or graphic images and other data on the display device 105. The video adapter 104, which is interposed between the display device 105 and the system bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic system software

Figure 2:
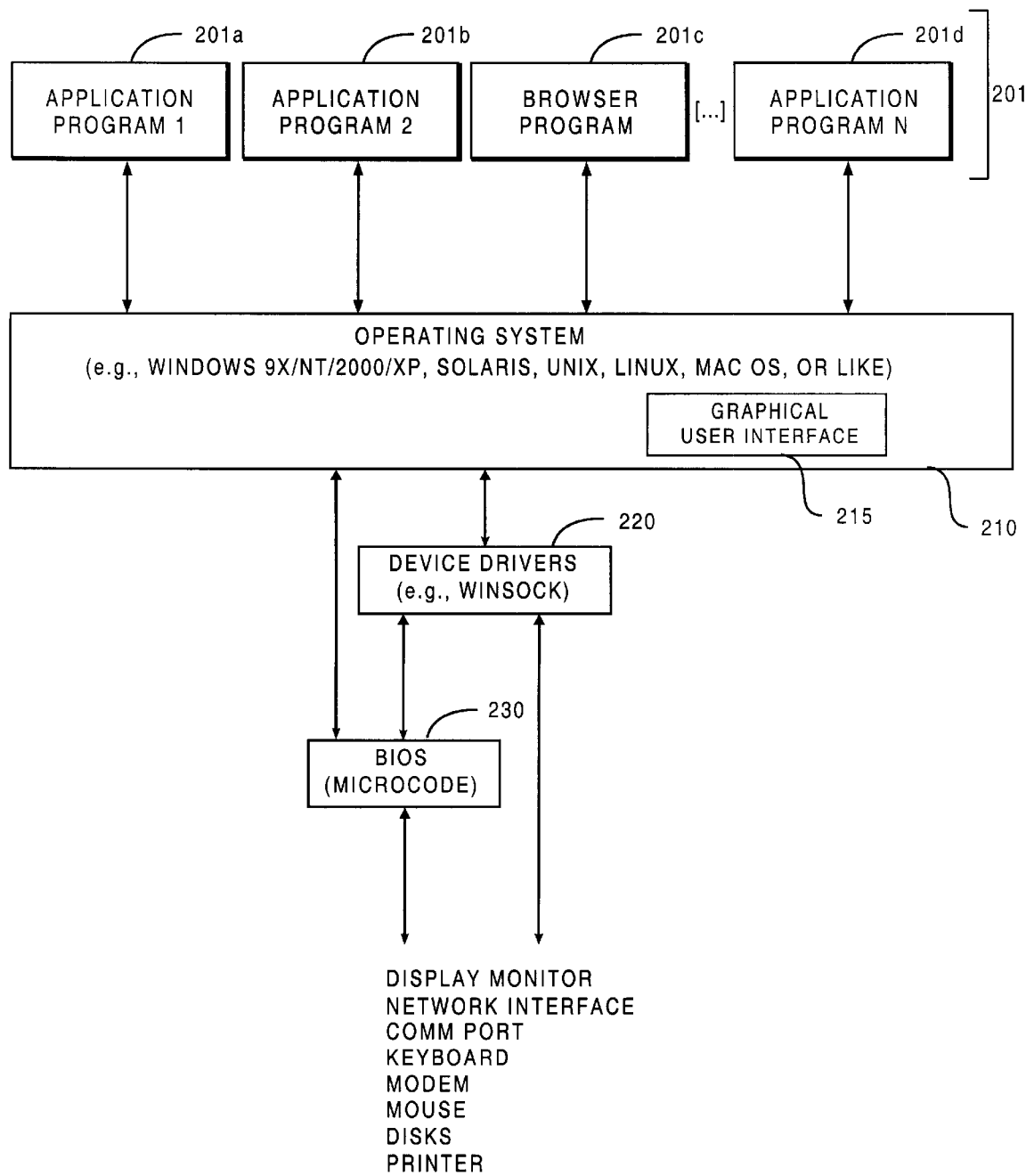
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from the operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

Client/Server Database Management System

Figure 3:
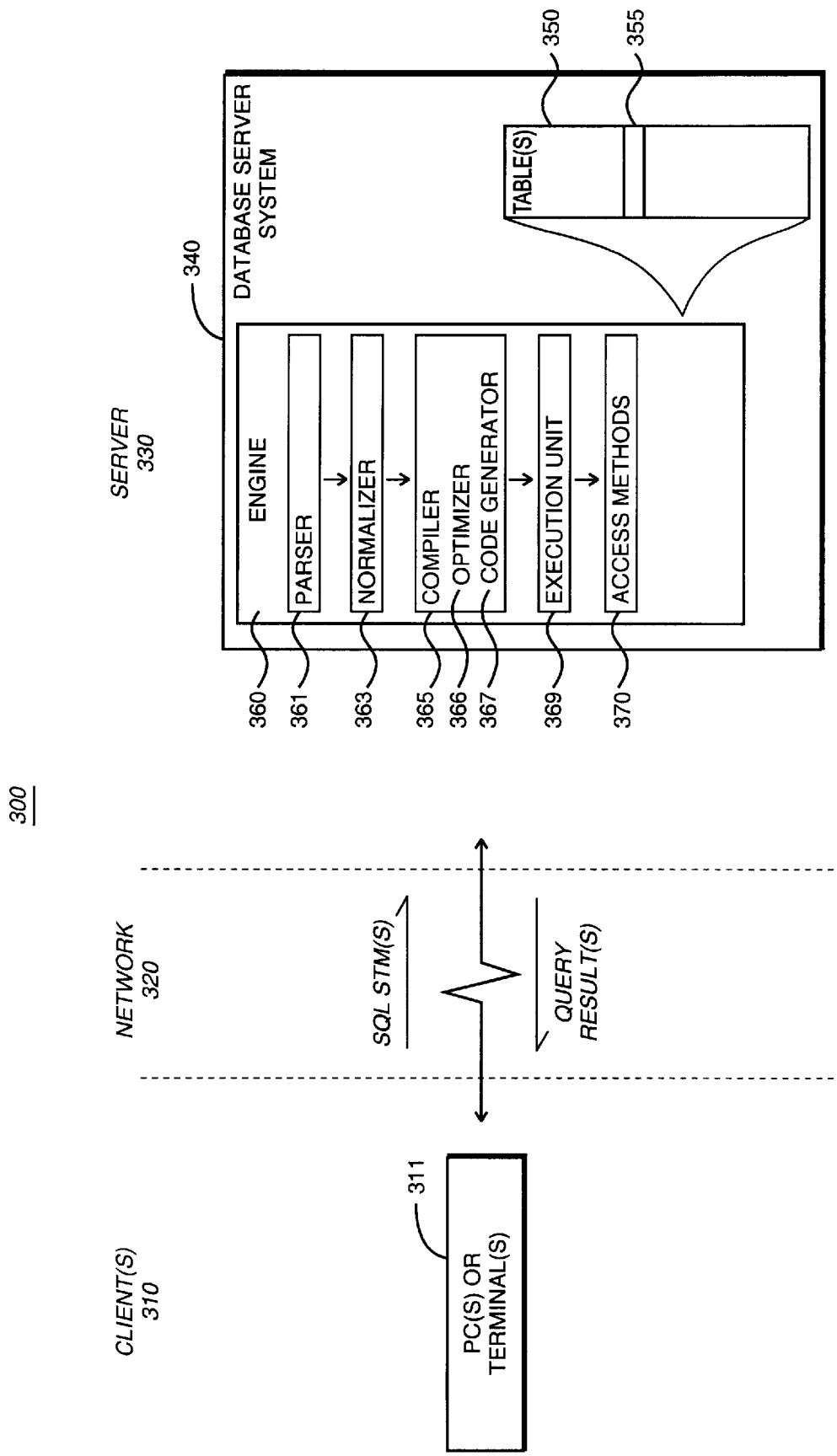
FIG. 3 is a block diagram of a client/server database system in which the present invention is preferably embodied.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows for PC clients.

The database server system 340, which comprises Sybase® SQL Anywhere® Studio (Adaptive Server®

Anywhere) (available from Sybase, Inc. of Emeryville, Calif.) in an exemplary embodiment, generally operates as an independent process (i.e., independently of the clients), running under a server operating system such as Microsoft® Windows NT, Windows 2000 or Windows XP (all from Microsoft Corporation of Redmond, Wash.), NetWare (Novell of Provo, Utah), or UNIX (Novell). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server," Second Edition, Addison-Wesley Publishing Company, 1995. Additional documentation of Sybase® SQL Anywhere® Studio (Adaptive Server® Anywhere) is available from Sybase, Inc. as "SQL Anywhere Studio 7.0 Collection Documentation" (e.g., at http://sybooks.sybase.com/awg0700e.html). For a general introduction to a Local Area Network operating under NetWare, see Freed, L. et al., "PC Magazine Guide to Using NetWare", Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the client(s) 310 store data in, or retrieve data from, one or more database tables 350, shown in FIG. 3. Typically resident on the server 330, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table 350. In addition to retrieving the data from Database Server tables, the clients also include the ability to insert new rows of data records into the table; clients can also modify and/or delete existing records in the table.

In operation, the SQL statements received from the one or more clients 310 (via Network 320) are processed by engine 360 of the database server system 340. The Engine 360 itself comprises a parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

The code generator, on the other hand, converts the query tree into a set of instructions suitable for satisfying the query. These instructions are passed to the execution unit 369. Operating under the control of these instructions, the execution unit 369 generates calls into lower-level routines, such as the access methods 370, for retrieving relevant information (e.g., row 355) from the database table 350. After the plan has been executed by the execution unit, the server returns a query result or answer table back to the client(s).

Of particular interest to the present invention is the optimization of database system performance by implementing an improved normalization methodology for discovery of prime implicates and query optimization. Modification of the operations of engine 360 for implementing this methodology will now be described in further detail.

II. Prime Implicates and Query Optimization in Relational Databases

A. Overview

The improved normalization methodology of the present invention is based on Socher's minimization method, which uses a matrix as its basic data structure (Socher, R., above). The rows of the matrix represent unique literals and the columns represent the particular conjunct (or disjunct) in which the literals appear. Prime implicants and implicates are discovered by generating all paths through the matrix and discarding subsumed paths.

Wang implemented a version of Socher's matrix method to convert Boolean expressions between normalized forms (Wang, Y., above). Wang's implementation, which was intended for use in an SQL to IMS gateway, required normalized search conditions as input and assumed the use of two-valued logic. The improved methodology of the present invention, on the other hand, features several advances that are key to allowing it to operate with reduced memory requirements on non-normalized three-valued SQL search conditions.

One important difference between the present method and those of Socher and Wang is that tautological and contradictory conditions are removed from the input expression prior to prime implicant generation. The importance of this step of pruning conditions from the input data structure lies in the fact that memory consumption is reduced by decreasing the size of the input to the conversion routines.

Another important difference is the process for conversion of disjunctive sub-branches within a conjunctive expression. Search conditions in many SQL queries are in partial CNF; hence a naive implementation of Socher's method requires that all terms in the expression be fully normalized prior to conversion. The present invention avoids the combinatorial explosion in the number of terms that full normalization might entail. Moreover, the present invention also discovers exploitable conjunctive conditions within these non-normalized expressions to enable optimization of these types of queries.

Many beneficial conversions of non-normalized expressions are made by repeatedly transforming into CNF those DNF expressions nested within conjunctive terms. The present invention repeatedly generates prime implicates of disjunctive sub-expressions nested within a conjunctive expression, thereby normalizing the search condition piece-by-piece. In the event that the sub-expressions are not fully in DNF—that is they contain sets of conjuncts or disjuncts unioned together by Or operators—the method treats the entire sub-expression as DNF and its unnormalized sub-expressions as literals and converts accordingly. The improved normalization methodology of the present invention is described in more detail below.

B. Preprocessing and normalization phases

The improved normalization methodology of the present invention comprises a preprocessing phase and a normalization phase. The preprocessing phase includes several steps that are designed to simplify the original query expression, thereby simplifying the matrix processing occurring in the normalization phase.

Figure 4A:
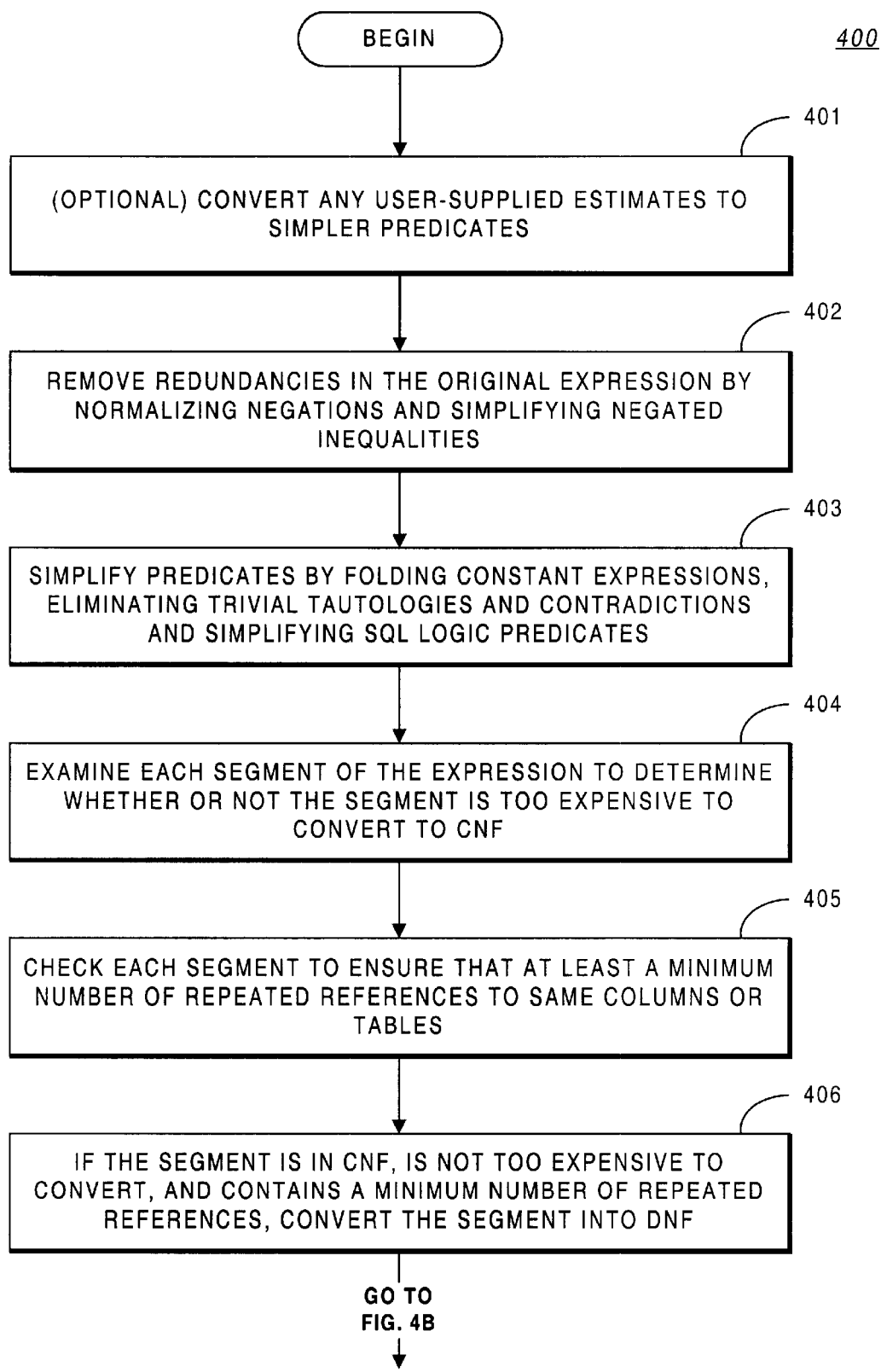
FIGS. 4A–B comprise a single flow chart illustrating method steps of the improved normalization methodology of the present invention.
Figure 4B:
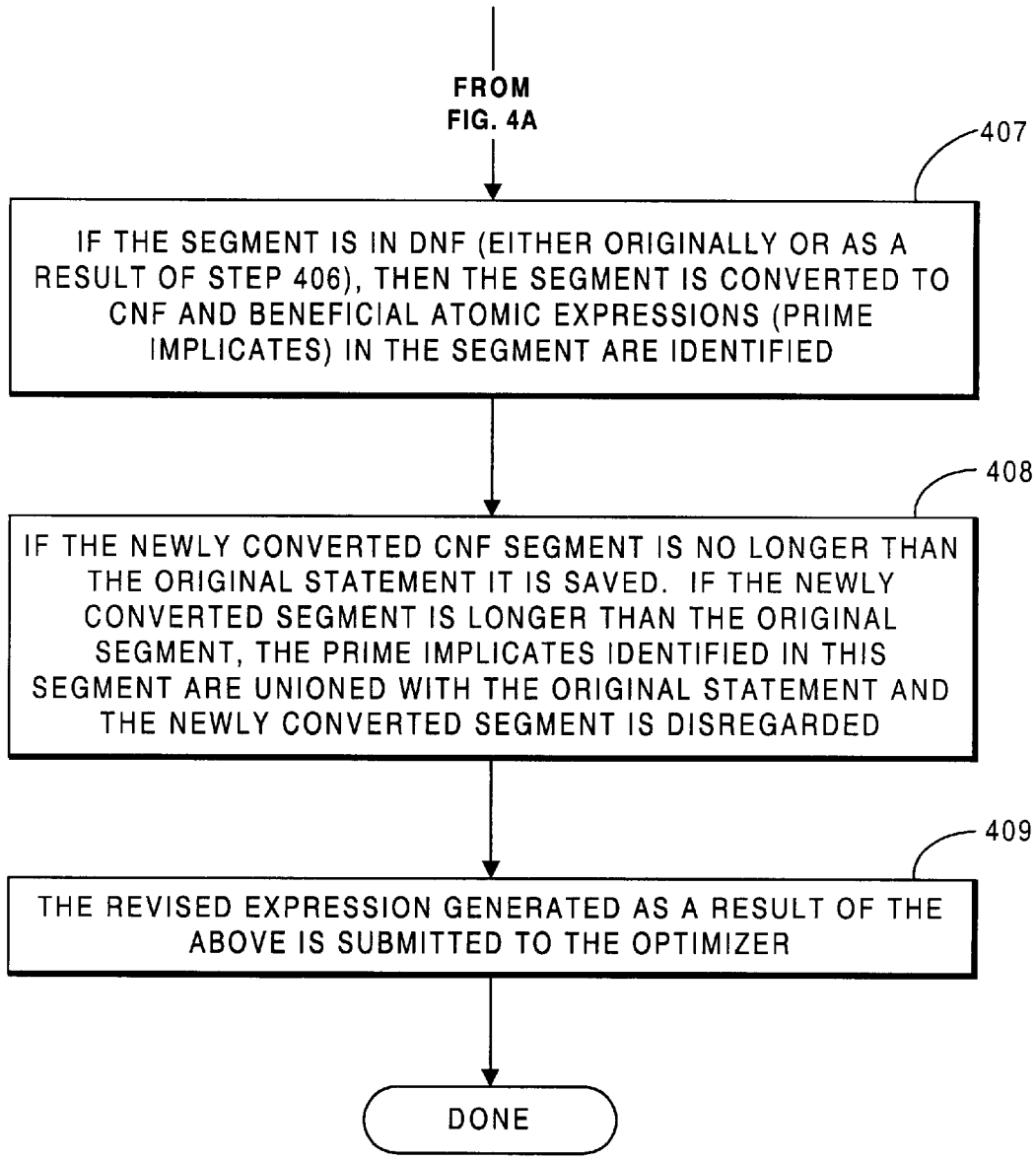

The normalization phase takes an unnormalized search condition as input and evaluates the eligibility of the expression or portions of the expression for normalization. This phase takes a segment of the search condition, normalizes this segment using a normal form matrix representation, and returns a set of prime implicates that may either replace or be concatenated to the original. FIGS. 4A–B comprise a single flow chart illustrating the detailed method steps of the improved normalization methodology of the present invention.

1. Simplification of User Estimates

The currently preferred embodiment of the present invention permits a system administrator to insert a user estimate on any predicate or set of predicates that will override the optimizer. As shown in FIG. 4A, as an optional step 401, the preprocessing phase commences with the conversion of these user-inserted estimates to simpler predicates by:

(a) Eliminating parentheses from each search condition.
  (b) Detecting whether a not exists in the statement.
  (c) Pushing user estimates down to simpler predicates.

2. Removal of Redundancies

Step 402, as shown on FIG. 4A, involves the removal of redundancies in the original expression by:

(a) Normalizing negations by pushing them down into simpler predicates (e.g., not, not {p} is changed to {p}).
  (b) Simplifying negated [in]equalities by reversing signs (e.g., not {x<5} is changed to x≧5).
  (c) Switching not Any to All and not All to Any whenever possible.

3. Simplifying Predicates

Step 403, as shown in FIG. 4A, simplifies the expression by eliminating tautologies (statements that are always true) and simplifying predicates and operator conditions as follows:

(a) Folding constant expressions when the expressions contain integers (e.g., x=3+4 is changed to x=7) and the columns referenced in the statement are numeric.
  (b) Removing trivial tautologies (e.g., 1=1) and contradictions (e.g., 1=0).
  (c) Simplifying SQL logic predicates (for example, Is Unknown [false] to false, Is Unknown [true] to false, not [false] to true, and not [true] to false)
  (d) Pruning portions of the query tree by simplifying tautological conditions that are Anded or Ored together (e.g., p OR true becomes simply true).

4. Examination and Selective Normalization

After the above preprocessing steps, the normalization phase of the present invention commences the process of selective examination of the expression to determine whether or not portions of the expression should be fully normalized and converted to CNF. Rather than proceeding to fully normalize the expression, which in many cases would be inefficient and result in an explosion of terms as described above, the normalization phase of the present invention selectively examines each element of the SQL statement by carefully descending the logic tree of the query. The expression is examined in segments and for each segment a determination is made as to whether or not it is advantageous to normalize that segment and convert it to CNF. Segments that are "expensive" to fully normalize are not fully normalized to avoid a combinatorial explosion of terms and the resulting impact on system performance. Effectively, a limit is imposed on the depth to which sub-expressions are fully normalized to avoid an explosion in the number of terms. This selective examination process of the present invention commences with step 404, as shown on FIG. 4A, which includes the following:

(a) As In lists are discovered, the number of elements in each such list are counted in order to determine whether or not the list is "expensive" and should not be converted. If the running total of elements counted exceeds the maximum allowable number of elements (for example, a total of more than 45 elements), the segment is deemed "expensive" and is not converted.
  (b) Similarly if the segment contains a subquery it is deemed to be "expensive."
  (c) If the node of a branch in the expression tree is an Or, then the segment is considered to be in DNF. Rather than to fully normalize this segment and increase the length of the expression, this type of non-normalized segment is simplified by considering the whole branch as a literal (i.e., a single term).
  (d) If the node of a branch in the expression tree is an And, the segment is scanned to determine if this segment of the statement is, as a whole, in CNF.
  (e) If the CNF segment as a whole is neither fully normalized nor expensive add individual branches whose top-level nodes are ORs to a linked list containing pointers to these branches. These 'partial-DNF' branches ('partial-DNF' because they may either be fully normalized or because they may be partially DNF normalized) serve as statement inputs to normalization and simplification steps 405 through 408 below.

5. Minimum Number of Repeated Literals

Step 405, as shown in FIG. 4A, checks each segment to ensure that each segment contains at least a minimum number of repeated references to the same columns or tables. If a segment has several conditions and each of these conditions refers to different columns or tables, then it is not worthwhile to attempt to fully normalize the segment. Thus, if a segment does not satisfy either conditions (a) and (b) or, alternatively, condition (c) below, then the process of normalization of such segment is aborted because it will not generate useful results that can be exploited by the optimizer. However, if there appears to be at least one condition that can be exploited by the optimizer, the method proceeds to step 406. The conditions evaluated at step 405 are as follows:

(a) The intersection of the attributes of two or more literals is not null (e.g., $\alpha(D,E) \cap \alpha(F,G) \neq \emptyset$).
  (b) The intersection of the schemas of two or more literals is not null (e.g., $sch(D,E) \cap sch(F,G) \neq \emptyset$).
  (c) One of the disjunctive literals references one of the conjunctive literals in the statement (basically, this means check to see if the literals reference the same table).

6. DNF Conversion

In step 406, as shown in FIG. 4A, any segments of the statement that are in CNF are converted to DNF. This step 406 comprises:

(a) Merging In lists within individual maxterms.

(b) If it is not too expensive and there are a minimum number of repeated literals (as determined in step 405), the segment is converted into DNF (and at the same time redundant terms are removed) using an implementation of Socher's method. If the conversion is not successful, the conversion process is aborted.

7. CNF Conversion

Next, as step 407, as shown in FIG. 4B, if the statement or segment is in DNF (either originally or as a result of conversion to DNF in step 406), then the statement is converted to CNF. This step 407 comprises:

(a) If it is not too expensive and there are a minimum number of repeated literals (as determined in step 405):
(i) Converting the segment into CNF and at the same time removing redundant terms using an implementation of Socher's method; (ii) If the conversion is successful merging In lists that appear within individual maxterms (for example, if {x In 3, 4} is merged with {x In 5, 6} to create one term {x In 3, 4, 5, 6}; and (iii) Determining whether or not each given CNF atomic expression is beneficial in its current form and identifying the useful expressions.

8. Evaluation and Discovery of Prime Implicates

Step 408, as shown in FIG. 4B, evaluates each segment and the set of useful conjuncts (or prime implicates) inferred by the DNF/CNF conversions of steps 406 and 407 above as follows:

(a) The number of terms generated as a result of the above DNF/CNF conversion process are counted. If the number of terms in the newly-generated CNF segment are less than or equal to the number of terms in the original statement, then the newly-generated CNF segment is saved.

(b) If, however, the number of terms in the newly-generated CNF segment are greater than the number of terms in the original segment, then the fully converted CNF segment is presumed not to be useful. In this case, the useful conjuncts (prime implicates) inferred from the DNF/CNF conversions are unioned ('Anded') with the original statement and the generated CNF segment is disregarded. The result is a search condition that is semantically equivalent to the original expression, but that contains useful implicates that can be exploited by the optimizer. This enables better optimization of the original SQL statement.

9. Submit revised expression to optimizer

The final step 409, as shown in FIG. 4B, is to submit the revised expression generated as a result of the above improved normalization methodology to the optimizer to enable the optimizer to exploit this expression.

C. Detailed description of normalization functionality

1. Definitions

The following definitions pertain to the description of the improved normalization methodology of the present invention.

In the context of relational databases a "predicate" is a truth-valued function possibly negated whose domain is a set of attributes and/or scalar values and whose range is [true, false, unknown]. In the previously-referenced literature relating to the simplification of Boolean expressions, the basic unit of any expression is termed a "literal." In this document a "predicate" corresponds to a "literal" and "search condition" to a "formula." The two-valued complement of a predicate p is defined only for predicates p that cannot evaluate to unknown and is simply the logical not of p. A search condition denotes a set of predicates connected by three-valued logic variants of logical and and or. Hence a predicate corresponds to one of the many forms of conditional expressions such as $\theta$-comparisons, Like conditions, and Between conditions that can appear in a search condition corresponding to an ANSI SQL query's Where or Having clause or an On condition in a table expression. Note that in ANSI SQL queries a search condition is interpreted as false if it evaluates to unknown.

A clause is a conjunction of predicates (a "conjunctive" clause) or a disjunction of predicates (a "disjunctive" clause). A clause is "fundamental" if it does not contain any complementary pairs of predicates. A clause D is in "disjunctive normal form" (DNF) if it is a disjunction of conjunctive clauses $C_1, C_2, \ldots C_n$ such that $D = \vee^n_{i=1} C_i$. DNF is often termed "sum of products" form. A clause D is in partial DNF if it is a disjunction of clauses $C_1, C_2, \ldots C_n$ where at least one $C_i$ is not a conjunctive clause. Conversely, a clause C is in "conjunctive normal form" (CNF) if it is a conjunction of disjunctive clauses $D_1, D_2, \ldots D_n$ such that $C = \wedge^n_{i=1} D_i$. CNF is often termed "product of sums" form. A clause C is in partial CNF if it is a conjunction of clauses $D_1, D_2, \ldots D_n$ where at least one $D_i$ is not a disjunctive clause.

A conjunctive clause is an "implicant" of a search condition E if does not contain redundant predicates and A=>E; hence all conjunctive clauses of a fully normalized condition E in DNF are its implicants. A is termed a "prime implicant" of E if A is an implicant of E, A is fundamental, and there does not exist another implicant A' such that A'=>A.

A disjunctive clause is an "implicate" of a search condition E if does not contain redundant predicates and E=>A; hence all disjunctive clauses of a fully normalized condition E in CNF are its implicates. A is termed a "prime implicate" of E if A is an implicate of E, A is fundamental and there does not exist another implicate A' such that A'=>A. A minimal CNF (DNF) search condition G equivalent to a CNF (DNF) formula F is a conjunction (disjunction) of prime implicates (implicants) of F such that if any clauses of G are removed $G \neq F$.

An exploitable predicate is one which can be utilized during optimization and/or query execution to reduce the query's overall execution cost. (In this document, exploitable predicates are also referred to as "prime implicates".) Since the usefulness of any given predicate may depend on the physical query execution methods supported by the database server any measure of a predicate's utility is somewhat system-dependent. In the case of TPC-D Query 19 described above, it is clear that the derivation of the prime implicate P-Partkey=L-Partkey would be extremely useful to most if not all query optimizers since it constitutes a join predicate.

Search conditions may contain redundant predicates and redundancy commonly occurs with application software that generates SQL queries. Wang categorized various forms of such redundancies and which are restated below (Yalin Wang, above). A "PP redundancy" stems from the repetition of a literal (predicate) as $s \wedge r \wedge q \wedge r <=> s \wedge q \wedge r$ (idempotency). A "PQ-QP redundancy" stems from commutative laws as srq<=>qrs. An S-SP redundancy follows from absorption laws as $(p \wedge q \wedge s) \vee s <=> s$. All three categories of redundancy hold for both two- and three-valued logic.

A PP' (P-P prime) redundancy results from the existence of non-fundamental clauses. In CNF, a non-fundamental clause C containing both a literal and its two-valued complement can be automatically eliminated since it always evaluates to true (C is a tautology). Similarly, a non-fundamental clause D in a DNF formula may be eliminated since it must evaluate to false (D is a contradiction).

Socher's matrix transformation algorithm, which is used to convert clauses from one normalized form, uses a matrix as its basic data structure. "A normal form matrix M is an n×k matrix over the set {0, 1 }" (see Socher, R., above). The n rows of M represent each unique literal in the input expression and the k columns of M represent the maxterm or minterm in which the literal appears. The notation M(i,j) is used to denote the element of M in the ith row and the jth column. For brevity the formulas in this document use multiplication to denote the logical AND.

Both the disjunctive formula $abe \lor bc \lor cd \lor e$ and the conjunctive formula $(a \lor b \lor e)(b \lor c)(c \lor d)e$ can be represented by the normal form matrix:

|   | 1 | 2 | 3 | 4 |
|---|---|---|---|---|
| a | 1 | 0 | 0 | 0 |
| b | 1 | 1 | 0 | 0 |
| c | 0 | 1 | 1 | 0 |
| d | 0 | 0 | 1 | 0 |
| e | 1 | 0 | 0 | 1 |

A "complete path" P through M is defined as a sequence $(p_1, \ldots, p_n)$ of literals such that $(p_1 \lor p_2 \lor \ldots \lor p_n)$ is an implicate of the equivalent CNF expression. Similarly P denotes an implicant $(p_1 \land p_2 \land \ldots \land p_n)$ when constructing an equivalent DNF expression. The term P(i) denotes the ith element of the path P.

A "path" through M is defined as a subsequence of a complete path and as such represents an incomplete portion of an implicate or implicant. The concatenation of two paths P and Q is denoted with the notation $P \oplus Q$. The set of literals (predicates) contained in a path P is denoted with L(P) and the cardinality of that set with $\|L(P)\|$. Similarly, the number of literals in an expression E is expressed as $\|E\|$.

The set of all complete paths through M represents the prime implicates (implicants) of a CNF (DNF) expression. The term "complete path set" is also used to refer to the set of disjuncts of a partial DNF expression some of which may be prime implicants. The implicates or implicants of a complete path set represent a non-minimal semantically equivalent cover of the original expression. If a complete path corresponding to a prime implicant (implicate) is removed the complete path set may no longer be semantically equivalent to the original expression.

2. Normalization Phase

The normalization phase of the present invention involves the simplification and conversion of an SQL search condition that is simplified and converted in two distinct operations. The first operation, referred to as "branch conversion," takes an unnormalized search condition as input and evaluates the eligibility of the expression or portions of the expression for normalization. The second operation, which is called from within the first operation and is referred to as "CNF conversion," takes a portion of the condition and normalizes it using a normal form matrix representation and returns a set of prime implicates that may either replace or be concatenated to the original. The search conditions are typically represented using an "expression tree" that is commonly used by compilers and SQL language parsers to represent a conditional expression. Such a structure is not a requirement of the methodology of the present invention, though its use supports the simplification of the original condition through constant folding and predicate pushdown.

a) Branch Conversion

The branch conversion operation scans the operators and predicates of a search condition to assess their eligibility for transformation. The "Normalize" function whose pseudocode is shown below acts as the main dispatcher for the conversion routines.

Pseudocode for Main Normalization Method

```
Procedure: NORMALIZE
Purpose: Simplify and discover prime implicates of an expression E.
Input: A non-empty search condition of an SQL statement, E.
Local variables: B, a list of pointers to expression branches that
require conversion.
s, a pointer to a branch in the expression tree.
satisfied, a Boolean variable.
begin
    if the root node of E is an Or then
        satisfied ← CheckConditions(E)
        if satisfied is false then
            return
        else
            Consider E to be in DNF and add its root node to B
        fi
    else if the root node of E is an And then
        if E is in CNF then
            Add the root node of E to B
        else
            for each sub-branch s ∈ E whose root node is an Or do
                satisfied ← CheckConditions( s )
                if satisfied is false then
                    return
                else
                    Add s to B
                fi
            od
        fi
    else
        return
    fi
    for each expression branch item s ∈ B do
        call InvertNF( s )
    od
end
```

This Normalize function takes as input an expression tree representing the search condition to simplify. A linked list of pointers is used to track which branches in the expression tree should be converted; by iterating over this list and converting each branch contained therein, the prime implicants and implicates are generated. If the root node of the expression tree is an And, the tree is checked to see if it is in conjunctive normal form. If the expression is in CNF the entire tree can be converted from CNF to DNF and back to CNF to eliminate redundancy. If the expression is conjunctive but contains disjunctive sub-expressions, the sub-expressions are treated as if they were in DNF and their root nodes are added to the linked list of pointers. On the other hand, if the root node of the expression tree is an Or the entire tree is treated as if it were in DNF and any disjuncts nested within conjunctive terms are treated as individual literals to allow the conversion to take place. These steps allow partially-normalized search conditions to be simplified by considering whole branches as literals (rows) in the matrix.

The function "CheckConditions" referenced in the above Normalize function pseudocode accepts or disqualifies a branch of the expression tree from normalization. This function scans the predicates within a branch to assess two preconditions:

1. Normalization is advantageous: at least two predicates in the branch refer to the same (base or derived) table or, even better, the same (base or derived) column, whose normalization could result in a simplified expression or discovery of local implicates that could be further pushed down in the access plan; and 2. Normalization is disadvantageous: the normalized form of the expression would consume too much memory or result in the duplication of expensive predicates such as those containing large In-lists or quantified subqueries.

If the first condition is false or the second is true then normalization of this branch is avoided and the Normalize function considers the next branch in turn. The precise nature of these tests can be altered depending upon the database server's capabilities. In the currently-preferred implementation, the discovery of large In-lists or subqueries in a branch results in a decision not to normalize the branch, but other implementations may relax this condition if, for example, such implementation supports bit-mapped indexing schemes that can efficiently handle large In-lists.

b) CNF Conversion

Once the search condition has been scanned the following conversion routine "InvertNF" is called by the Normalize function:

Pseudocode for InvertNF

```
Procedure: InvertNF
Purpose: Create the normal form matrix, and convert expressions.
Input: A DNF/CNF expression, E.
Output: A transformed CNF expression.
Local variables: M, a normal form matrix.
P, denoting the complete path set.
t, an expression tree.
begin
    if the matrix created from E would exhaust memory constraints
then return
    else
        From E, construct a normal form matrix M
    fi
    P ← ConvertNF( M )
    if E was originally in CNF then
        if the matrix created from P would exhaust memory constraints
then
            return
        else
            - - At this point, the expression is in DNF.
            From P, construct a new normal form matrix M
            P ← ConvertNF( M )
        fi
    fi
    - - At this point, the expression is in CNF.
    From P, construct a new expression tree t
    if t ≢ E then
        --E must have contained disjunctive terms.
        for each atomic conjunctive predicate c ∈ t do
            --c is prime implicate.
            Eliminate c from each conjunctive clause in E
        od
        Concatenate t to E
    else
        E ← t
    fi
end
```

The InvertNF function converts to CNF each branch of the tree in the linked list. InvertNF calls ConvertNF to remove redundancy by performing full CNF conversion on the original branch. If however the number of literals generated by full CNF conversion results in a more complex expression then InvertNF simply concatenates exploitable prime implicates with the original expression to create a semantically-equivalent portion of the search condition. The global variable $T_E$ denotes the total number of exploitable conditions in the normalized expression. In the event that a CNF expression is passed as an argument it is first converted to DNF and then back to CNF to remove redundancy. Additional checks are made to ensure that the matrix to be created from the original expression will not consume an excessive amount of memory; these limits can be dynamically modified depending upon the amount of server memory currently available.

The function "ConvertNF", which implements Socher's conversion algorithm "Transform," is illustrated below.

Pseudocode for conversion method

```
Procedure: ConvertNF
Purpose: Convert n expression from one norm 1 form to the other.
Input: A normal form matrix, M.
Output: A complete path set.
Local variables: Complete path set, P; the current path, C.
    begin
        P ← null value
        while true do
            Delete from M every column containing zero entries only
            Delete every absorbed column of M
            if M is empty then
                break
            fi
            Rearrange M | M(1, 1) = 1 ∧ M(1,j) has the maximum
number of 1-entries
            C ← the literal corresponding to M(1, 1)
            C ← GeneratePaths(2, C, M, P)
            if converting from DNF to CNF then
                C ← MarkUselessImplicates( C )
            fi
            P ← P ⊕ C
            Delete first row of M
        od
        if converting from DNF to CNF then
            if $T_N$ > ‖ E ‖ + $T_E$ then
                P ← DeleteUselessImplicates( P )
            fi
        fi
        P ← RemoveRedundancy( P )
        return P
    end
```

The ConvertNF function generates a complete path set corresponding to a modified conjunctive or disjunctive form of the original expression. The primary advantage of Socher's method is that it not only simplifies the original expression by eliminating redundancy, but also in doing so it does not require naive generation of redundant clauses followed by a separate step to eliminate that redundancy. Eliminating the generation of redundant terms during conversion relies on the discovery of two matrix properties "absorption" and "subsumption" that correspond to the existence of S-SP redundancies in the original expression.

A column j of M can be said to "absorb" the column k of M if $M(i,j) \leq M(i,k)$ for each row i in M. This corresponds to the existence of an S-SP redundancy in the formula represented by the matrix. For example, in above normal form matrix representing the formula ae∨bc∨cd∨e, column 1 is absorbed by column 4 corresponding to the S-SP redundancy abe∨e<=>e in the original formula. Hence column 1 can be removed from the matrix in its entirety yielding a smaller 5×3 matrix representing a simpler equivalent expression.

A path P "subsumes" a path Q if the literals of P form a subset of the literals of Q. Socher identified the following two conditions that imply path subsumption:

1. Let p be a row of M such that M(p,1)=1; recall that p represents a literal (predicate). A complete path P is a subsumed path if P(k≠1)=p.
2. Let P be a complete path of M with P(k)=p. If there exists a column i≠k such that M(p, i)=1 and p≠P(i) then P is a subsumed path.

Consider, for example, the 2nd row of the above normal form matrix that represents the literal b. Any path P containing M(b,2) at position k≠1 is redundant since it represents either a PP redundancy if P(1)≡b, or an S-SP redundancy with some other implicant (implicate) having P(1)=b.

The ConvertNF function loops over each row of the normal form matrix M. In each iteration it deletes rows consisting entirely of zeros. It also deletes absorbed columns from the matrix to ensure that no complete paths are duplicated. As result of deleting rows and columns M becomes smaller; the method completes when the matrix no longer contains any 1-entries.

As long as the Matrix includes rows with 1-entries, the rows and columns of M are interchanged so that the first row contains the maximal number of 1-entries and the first column is a 1-entry. By "first developing a row with a maximal number of 1-entries [fewer complete] paths are [generated] . . . than by developing any other row that is not maximal" (Wang, Y., above). Once the initial path through M(1,1) is set up ConvertNF calls "GeneratePaths" to compute the paths through the normal form matrix row by row. The GeneratePaths function is described below:

Pseudocode for GeneratePaths function

```
Procedure: GeneratePaths
Purpose: Recursively generate all qualified paths for row.
Inputs: An integer, j; a path, C; a normal form matrix, M; a path set, P.
Output: A partial set of complete paths.
Local variable: A literal, q.
begin
    while j ≤ no. columns of M and ∃ p ∈ P(C) such that M(p, j)=1 do
        j ← j +1
    od
    if j > no. columns of M then
        P ← P ⊕ C
        return P
    fi
    for each q ∈ literals of M such that M(q, j)=1 do
        P ← GeneratePaths(j +1, C ⊕ q, M, P)
    od
    return P
end
```

GeneratePaths creates a partial set of complete paths by recursively concatenating additional literals to the initial path. The initial path corresponds to the literal represented by element M(1, 1) (see above ConvertNF function). Repeated literals (PP redundancies) are avoided by ignoring columns that are contained in the initial path. Once a complete path has been obtained both the current path and path set are returned.

However if the path is incomplete the remaining paths are generated recursively by GeneratePaths. This path generation function of the present invention is similar to Wang's implementation, but it omits the detection and removal of PP' (P-P prime) redundancies, thereby avoiding the difficulties associated with identifying complementary SQL predicates. As a consequence it must be the case that the path set returned by GeneratePaths will not be empty.

If an expression is being converted from DNF to CNF, the implicates represented by the generated path set are checked to ensure that they are useful. Those implicates that are not exploitable by the query optimizer are tentatively marked for deletion by the function MarkUselessImplicates which is described below:

Pseudocode for MarkUselessImplicates function

```
Procedure: MarkUselessImplicates
Purpose: Mark or delete useless conjuncts from path set.
Inputs: A path set, P.
Outputs: A path set.
Local variable: The current path in the path set, p.
begin
    for each p ∈ P do
        T_N ← T_N + ||L(p)||
        - - The usefulness of conjunct is optimizer-specific.
```

```
        if p is not exploitable then
            if T_N > ||E|| + T_E then
                Delete p
            else
                Mark p for deletion
            fi
        else
            T_E ← T_E + ||L(p)||
        fi
    od
    return P
end
```

ConvertNF continuously monitors the size of the converted expression being created. If the number of literals generated during the conversion exceeds the number of literals prior to conversion plus the number of exploitable literals then full CNF conversion is abandoned at that point. Instead ConvertNF continues to generate prime implicates but retains only those exploitable implicates that will later be concatenated to the original expression. Any non-exploitable implicates are subsequently deleted by a function called DeleteUselessImplicates (not shown) which deletes the complete paths that are marked.

Once an implicate has been deleted, the resulting expression is no longer semantically equivalent to the original. However, since each implicate P is generated solely from the original expression E we must have E=>P. Therefore, those implicates that are considered to be worthwhile can be concatenated (Anded) to the original clause and the non-exploitable (or "useless") implicates can be deleted from the result while still maintaining correctness. This activity of retaining exploitable implicates while deleting non-exploitable ones allows a query optimizer to exploit newly-generated implicates that can match the capabilities of the system's execution model yet avoids the memory impact of a fully CNF-converted expression. The nature of Socher's matrix conversion method is that as the matrix gets smaller the implicates have fewer literals; typically the last few implicates generated by ConvertNF are atomic conditions that are the easiest to exploit since they often represent a filtering predicate that can be pushed down or represent a join condition. For this reason, the ConvertNF continues to completion instead of halting immediately once the size of the converted expression exceeds that of the original.

Following Wang's implementation (Wang, Y., above) after generating the paths for the first row of M the row is deleted. This both simplifies the matrix and prevents the generation of all PQ-QP redundancies and many S-SP redundancies in the resulting expression. Once the loop has completed a path set representing the converted version of the original formula is obtained; however this path set may still contain S-SP redundancies due to the order in which the paths were generated. The function RemoveRedundancy described below is used to delete these S-SP redundancies, which in practice are relatively few in number.

Pseudocode for RemoveRedundancy function

```
Procedure: RemoveRedundancy
Purpose: Remove any redundant terms from path set.
Input: A path set, P.
Output: A path set.
Local variables: paths of a path set, p_1 and p_2.
begin
    for each p_1 ∈ P do
        for each p_2 ∈ P do
```

```
        if L(p₁) ⊂ L(p₂) then
            Delete p₂ from P
        fi
    od
  od
  return P
end
```

The complete path set generated by ConvertNF is guaranteed not to contain any redundancy except for PP' (P-P prime) redundancies since it avoids identifying fundamental clauses. However, because InvertNF considers disjunctive branches one at a time some global redundancy is possible because the same implicate may be generated for more than one branch of the original search condition.

Consider, for example, the search condition represented by the formula abc(d∨e)(d∨ef). The Normalize function will consider the conversion of only the conjunct (d∨ef) which will yield the formula abc(d∨e)(d∨e)(d∨J). To eliminate global redundancies, a separately-chained hash table (not shown) is used to identify and remove redundant implicates from the final expression tree.

3. Conclusion

In certain cases, a performance penalty is incurred for partial CNF expression trees with multiple DNF or partial DNF sub-branches. However, this penalty is generally acceptable for several reasons. First, conversion of DNF or partial DNF branches within a conjunctive expression can yield useful results without incurring the exponential explosion in terms that would result from normalizing the query's search condition prior to conversion. Moreover, DNF-to-CNF conversion is not as resource-intensive as CNF-to-DNF-to-CNF conversion and in typical SQL statements, DNF or partial DNF sub-branches are usually small. Hence the memory and time requirements for conversion are within satisfactory limits.

As previously described, TPC-D Query 19 is difficult to evaluate efficiently since the query's search condition lacks a conjunctive join condition between the Lineitem and Part tables. However, use of the CNF conversion methodology of the present invention enables the discovery of the following set of prime implicates shown which may be concatenated (Anded) to the original search condition.

```
Additional prime implicates added to search condition of TPC-D Query 19
    and P-Partkey = L-Partkey
    and L-Shipinstuct = 'DELIVER IN PERSON'
    and L-Shipmode In ('AIR', 'AIR REG')
    and P-Container In ('MED BAG', 'MED PKG', MED PACK,
                'SM CASE', 'SM BOX', 'SM PACK', 'SM PKG',
                'LG CASE', 'LG BOX', 'LG PACK', 'LG PKG')
    and (
        P-Brand = 'BRAND#23' or
        P-Brand = 'BRAND#12' or
        P-Brand = 'BRAND#34'
        )
```

If each In-list is considered to be an atomic predicate, then Query 19 is in DNF and contains a total of 24 literals. However, the improved normalization methodology of the present invention quickly discovers that converting the condition to CNF will yield a much larger formula; hence only useful implicates are generated and concatenated to the original condition. These include the join predicate P-Partkey=L-Partkey and the disjunctive clause over P-Brand as shown above. In addition, the methodology of the present invention merges the individual In-list predicates referencing P-Container. The modified query results in a significant performance improvement depending on the size of the database.

Another example demonstrating the opportunities for generating exploitable prime implicates is shown by TPC-D Query 7 (see Query 7 of the TPC-D Benchmark Version 2.0.0.12 Transaction Processing Performance Council) which is as follows:

```
Create View Shipping (Supp-Nation, Cust-Nation, Year) As
Select  N1.N Name As Supp-Nation,
        N2.N Name As Cust-Nation,
        Year( L-Shipdate ) As Year
From Supplier, Lineitem, Order, Customer, Nation N1, Nation N2
Where S-Suppkey = L-Suppkey
    and O-Orderkey = L-Orderkey
    and C-Custkey = O-Custkey
    and S-Nationkey = N1.N-Nationkey
    and C-Nationkey = N2.N-Nationkey
    and
    (
        (
        N1.N Name = 'Canada'
        and N2.N Name = 'China'
        )
        or
        (
        N1.N Name = 'China'
        and N2.N Name = 'Canada'
        )
    )
    and L-Shipdate between Date ( '1995 01 01')
    and Date('1996 12 31');
Select Supp-Nation, Cust-Nation, Year
From Shipping
Group By Supp-Nation, Cust-Nation, Year
Order By Supp-Nation, Cust-Nation, Year
```

The improved normalization methodology of the present invention analyzes the conditions on the Nation table to yield the following two additional prime implicates illustrated below.

```
Additional prime implicates added to search condition of TPC-D Query 7
    and
    (
        N1.N-Name = 'Canada'
        or
        N1.N-Name = 'China'
    )
    and
    (
        N2.N-Name = 'Canada'
        or
        N2.N-Name = 'China'
    )
```

Unlike Query 19, the Where clause in TPC-D Query 7 in the view 'Shipping' consists almost entirely of conjunctive terms. Consequently CNF conversion is only performed on the disjunctive clauses on N-Name. Because fully converting this branch of the search condition to CNF yields an expression much larger than the original, the methodology of the present invention only retains the two useful implicates and then concatenates these two implicates with the original expression. The discovery of these two implicates enables the query optimizer to alter its join strategy due to better estimation of the size of intermediate results and thereby improve performance.

The improved matrix conversion methodology of the present invention is an effective compromise between generating useful sets of prime implicates and being space efficient. It is particularly useful when optimizing SQL queries generated by third-party tools. In one example, a reporting query's unnormalized Where clause contained 98 disjunctive clauses with considerable numbers of redundant terms. The improved methodology of the present invention converted the entire search condition to CNF, resulting in the simplification of the expression to 18 predicates, two of which were conjunctive atomic conditions. Executing the rewritten query resulted in an enormous reduction in execution time.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for selective normalization of a query, the method comprising:
   receiving a query for processing;
   determining whether normalization of said query is advantageous;
   if normalization of said query is determined to be advantageous, normalizing said query; and
   otherwise, if normalization of said query is determined not to be advantageous, identifying prime implicates in said query and concatenating said prime implicates with said query to create a revised expression.

2. The method of claim 1, further comprising:
   processing said revised expression for generating a query result.

3. The method of claim 1, further comprising:
   submitting said revised expression to a query optimizer.

4. The method of claim 1, wherein said step of determining whether normalization of said query is advantageous includes determining whether said query includes a number of literals greater than a pre-selected maximum.

5. The method of claim 1, wherein said step of normalization of said query includes identification of all prime implicates in said query.

6. The method of claim 5, further comprising:
   determining whether said query that has been normalized (normalized query) is advantageous;
   if said normalized query is determined not to be advantageous, concatenating said identified prime implicates with said query in its original form.

7. The method of claim 5, wherein normalization of said query is deemed to be advantageous, but is aborted if literals generated during said normalization of said query exceeds a pre-selected maximum number.

8. The method of claim 7, wherein prime implicates identified during said normalization are concatenated with said original query if said normalization is aborted.

9. The method of claim 1, wherein said step of determining whether said normalization is advantageous includes evaluating whether said query contains a minimum number of repeated references to a table.

10. The method of claim 1, wherein said step of determining whether normalization is advantageous includes evaluating whether said query contains a minimum number of repeated references to a column.

11. The method of claim 1, wherein said step of determining whether normalization is advantageous includes determining whether said query contains a subquery.

12. The method of claim 1, wherein said step of normalizing said query includes using a matrix normalization approach.

13. The method of claim 1, wherein said step of normalizing said query includes the substeps of:
    if said query is in conjunctive normal form (CNF), converting said query to disjunctive normal form (DNF) using a matrix normalization approach; and
    if said query is in DNF, converting said query to CNF using a matrix normalization approach.

14. The method of claim 13, wherein said substep of converting said query to CNF includes converting said query that is in DNF as a result of a prior conversion.

15. The method of claim 1, wherein said step of normalizing said query includes selectively normalizing said query in segments.

16. The method of claim 1, wherein said step of normalizing said query includes the substeps of:
    examining each segment of said query to determine whether normalization of each segment is advantageous;
    if normalization of a segment is determined to be advantageous, normalizing that segment; and
    otherwise, if normalization of a segment is determined not to be advantageous, identifying prime implicates in that segment and unioning said identified prime implicates to that segment.

17. The method of claim 16, wherein said substep of determining whether normalization of a segment is advantageous includes evaluating whether that segment exceeds a pre-selected maximum number of literals.

18. The method of claim 16, wherein said step of determining whether normalization of a segment is advantageous includes verifying that at least two literals in that segment reference one table.

19. The method of claim 16, wherein said step of determining whether normalization of a segment is advantageous includes verifying that at least two literals in that segment reference one column.

20. The method of claim 1, further comprising:
    if a segment of said query includes a top-level node having a conjunctive condition, modifying that segment by adding individual branches with top-level nodes having disjunctive conditions to a linked list prior to said step of normalization of said query.

21. The method of claim 1, wherein said step of normalizing said query includes the substeps of:
    if a segment of said query is in conjunctive normal form (CNF), converting that segment to disjunctive normal form (DNF) using a matrix normalization approach; and
    if a segment is in DNF, converting that segment to CNF using a matrix normalization approach.

22. The method of claim 21, further comprising:
    evaluating each segment that has been converted to CNF (converted segment) to determine whether that converted segment is advantageous;
    if that converted segment is determined not to be advantageous, identifying prime implicates in that converted segment and concatenating said identified prime implicates with that segment in its unconverted form.

23. The method of claim 21, wherein a segment including a top-level node having a disjunctive condition is considered to be in DNF for purposes of normalization.

24. The method of claim 21, wherein said step of converting a segment to CNF includes determining whether that segment is beneficial in its unconverted form.

25. The method of claim 1, further comprising:
    simplifying said query prior to said step of normalization by normalizing negations.

26. The method of claim 1, further comprising:
  simplifying said query prior to said step of normalization by simplifying negated inequalities.

27. The method of claim 1, further comprising:
  simplifying said query prior to said step of normalization by simplifying leaves and operator conditions.

28. The method of claim 22, wherein said step of simplifying leaves and operator conditions includes removing tautologies and contradictions.

29. The method of claim 1, further comprising:
  simplifying said query prior to said step of normalization by simplifying SQL logic predicates.

30. In a database system, an improved method for normalization of a database query, the method comprising:
  receiving a query, said query comprising identifiable segments;
  if a particular segment is deemed desirable to normalize, normalizing that particular segment;
  if a particular segment is deemed undesirable to normalize, identifying any prime implicates in that particular segment; and
  creating a revised query based on appending prime implicates to said query for said particular segments deemed undesirable to normalize.

31. The method of claim 30, further comprising:
  processing said revised query for generating a query result.

32. The method of claim 30, further comprising:
  submitting said revised query to a query optimizer.

33. The method of claim 30, wherein said step of creating a revised query includes unioning any identified prime implicates in a particular segment to that particular segment.

34. The method of claim 30, wherein said step of creating a revised query includes using normalized segments for said particular segments deemed desirable to normalize.

35. The method of claim 30, wherein said step of normalizing a particular segment includes converting that particular segment to conjunctive normal form (CNF).

36. The method of claim 30, wherein a particular segment is not normalized if that particular segment includes a subquery.

37. The method of claim 30, wherein a particular segment is not normalized if normalization of that particular segment results in a longer expression.

38. The method of claim 30, wherein a particular segment is not normalized if that particular segment does not contain a minimum number of repeated literals.

39. The method of claim 30, wherein a particular segment is not normalized if that particular segment does not contain at least two references to a selected one of columns and tables.

40. The method of claim 30, wherein said step of normalizing a particular segment includes the substeps of:
  if that particular segment is in conjunctive normal form (CNF), converting that particular segment to disjunctive normal form (DNF) using a matrix normalization approach; and
  if that particular segment is in DNF, converting that particular segment to CNF using a matrix normalization approach.

41. The method of claim 40, wherein said substep of converting a particular segment to CNF includes converting a particular segment that is in DNF as a result of a prior conversion of that particular segment.

42. The method of claim 40, wherein said substep of converting a particular segment to DNF includes removing redundant terms.

43. The method of claim 40, wherein said substep of converting a particular segment to CNF includes removing redundant terms.

44. The method of claim 30, wherein said step of normalizing a particular segment includes identifying all prime implicates in that particular segment.

45. The method of claim 44, further comprising:
  determining whether a particular segment that has been converted to CNF (converted segment) is desirable;
  if said converted segment is determined not to be desirable, appending said identified prime implicates to that particular segment in its original form prior to conversion.

46. The method of claim 45, further comprising:
  determining whether said converted segment is desirable by comparing how many literals are in said converted segment before conversion and after conversion.

47. The method of claim 30, further comprising:
  simplifying said particular segment prior to said step of normalization by normalizing negations.

48. The method of claim 30, further comprising:
  simplifying said particular segment prior to said step of normalization by simplifying negated inequalities.

49. The method of claim 30, further comprising:
  simplifying said particular segment prior to said step of normalization by simplifying leaves and operator conditions.

50. The method of claim 49, wherein said step of simplifying leaves and operator conditions includes removing tautologies and contradictions.

51. The method of claim 49, wherein said step of simplifying leaves and operators conditions includes simplifying tautological conditions that are joined together.

52. The method of claim 30, further comprising:
  simplifying SQL logic predicates in said particular segment prior to said step of normalization.

* * * * *